United States Patent [19]

Nakazaki et al.

[11] Patent Number: 4,797,854
[45] Date of Patent: Jan. 10, 1989

[54] OPERATING SYSTEM FOR CONTROLLING MAN-MACHINE INTERACTION IN INFORMATION PROCESSING SYSTEM

[75] Inventors: Katsuichi Nakazaki; Yasumasa Nonoyama, both of Hyogo, Japan

[73] Assignee: Mitsubishi Denki Kabushiki Kaisha, Tokyo, Japan

[21] Appl. No.: 940,097

[22] Filed: Dec. 10, 1986

[30] Foreign Application Priority Data

Feb. 20, 1986 [JP] Japan .................................. 61-35713

[51] Int. Cl.4 ................................................ G06F 9/00
[52] U.S. Cl. ..................................... 364/900; 364/300
[58] Field of Search ......................... 364/200, 300, 900

[56] References Cited

U.S. PATENT DOCUMENTS 4,494,188 1/1985 Nakane et al. ...................... 364/200

Primary Examiner—Raulfe B. Zache
Attorney, Agent, or Firm—Bernard, Rothwell & Brown

[57] ABSTRACT

A man-machine interface operating system to be incorporated into an interactive information processing system for the interactive processing of image information, such as graphic processing. Input data is given by an input unit to an input batch control unit. A command execution control unit produces and/or updates interface data for executing a command on the basis of the input data, and makes a decision as to whether the input data is related to a continuation command or to a new command, and then the command execution control unit feeds the interface data for executing the command to a command processing unit. Thus, the batch control and the flexible interactive operation of the input data is achieved.

10 Claims, 3 Drawing Sheets

4,797,854

OPERATING SYSTEM FOR CONTROLLING MAN-MACHINE INTERACTION IN INFORMATION PROCESSING SYSTEM

BACKGROUND OF THE INVENTION

1. Field of the Invention

The present invention relates to an operating system for controlling man-machine interaction in an information processing system equipped with an interactive input-output unit, for graphic data processing. By way of example and, more particularly the invention relates, to a man-machine interface operating system which enables the flexible interactive graphic data processing operation of an input apparatus.

2. Description of the Prior Art

A computer-aided design system —a CAD SYSTEM— is one of the exemplary information processing systems. In executing interactive command functions, such as interactive graphic processing, on a CAD system, data is processed by processing input data given by a pointing device, such as a mouse.

FIG. 1 is a functional block diagram of a conventional man-machine interface operating system. In FIG. 1, indicated at 1 is a command selecting unit, for example, of the menu style, for selecting a command to be executed, at 2 is a command branching unit, at 3a, 3b, . . . and 3e are command processing units, and at 4a, 4b, . . . and 4e are pointing device input units corresponding to the command processing units 3a, 3b, . . . and 3e, respectively. The command processing units 3a, 3b, . . . and 3e can be called individually.

In operation, first, a command —a processing function— selected by the command selecting unit 1 invokes, for example, the processing unit 3a through the command branching unit 2 to execute command processing. Then, input data is given by the pointing device input unit 4a according to the contents of the process for each command processing function to execute processing. That is, the pointing device input unit 4a gives the input data in two steps of input operation, namely, a command selecting input operation and an input operation within each command.

The conventional man-machine interface operating system is described concretely in detail in "To analyze OS (operating system) of Macintosh (program name)", by Mizuo Nishibayashi, in which the operation program of the operation system is disclosed on NIKKEI BYTE, pp. 109, 111.

Since the conventional man-machine interface operating systems is thus constituted, when once the input mode is selected by a command, the pointing device needs to be operated for input operation to the last step according to the input sequence of the command (processing function). If the input operation of the command is interrupted, the command needs to be given again.

SUMMARY OF THE INVENTION

Accordingly, it is an object of the present invention to provide a man-machine interface operating system capable of restarting the execution of the successive steps of a command after the command input operation has been interrupted in the middle of the routine or capable of interrupting the command input operation.

A man-machine interface operating system according to the present invention controls input operations of input means, such as a pointing device or mouse, in batch and controls the interface uniformly for each processing function (command). The input means may also be a light pen or a keyboard, and the keyboard may be used with the mouse or the light pen.

DETAILED DESCRIPTION OF THE PREFERRED EMBODIMENT

A man-machine interface operating system, in a preferred embodiment, according to the present invention will be described hereinafter with reference to the accompanying drawings.

Figure 1:
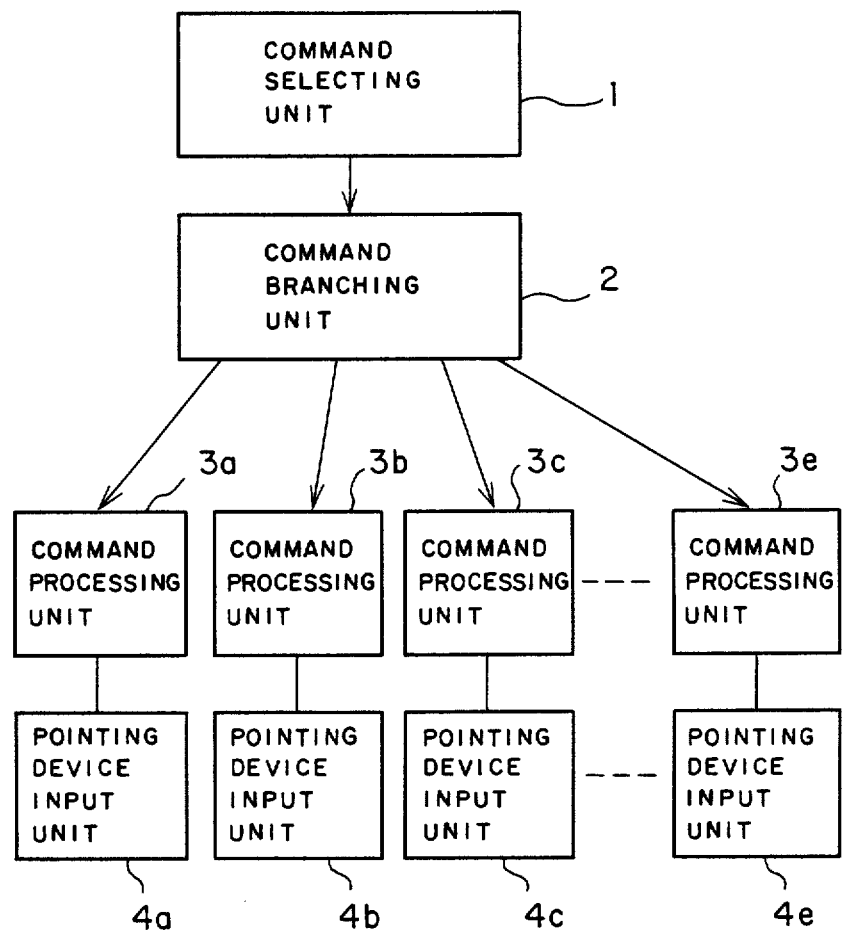
FIG. 1 is a block diagram showing the constitution of a conventional man-machine interface operating system.
Figure 2:
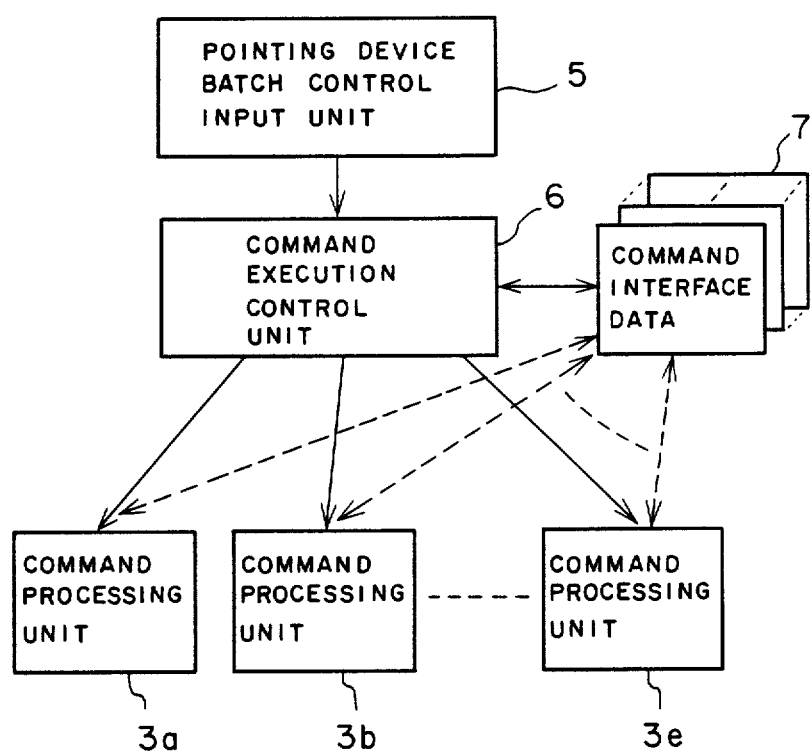
FIG. 2 is a block diagram showing the constitution of a man-machine interface operating system, in a preferred embodiment, according to the present invention.
Figure 3:
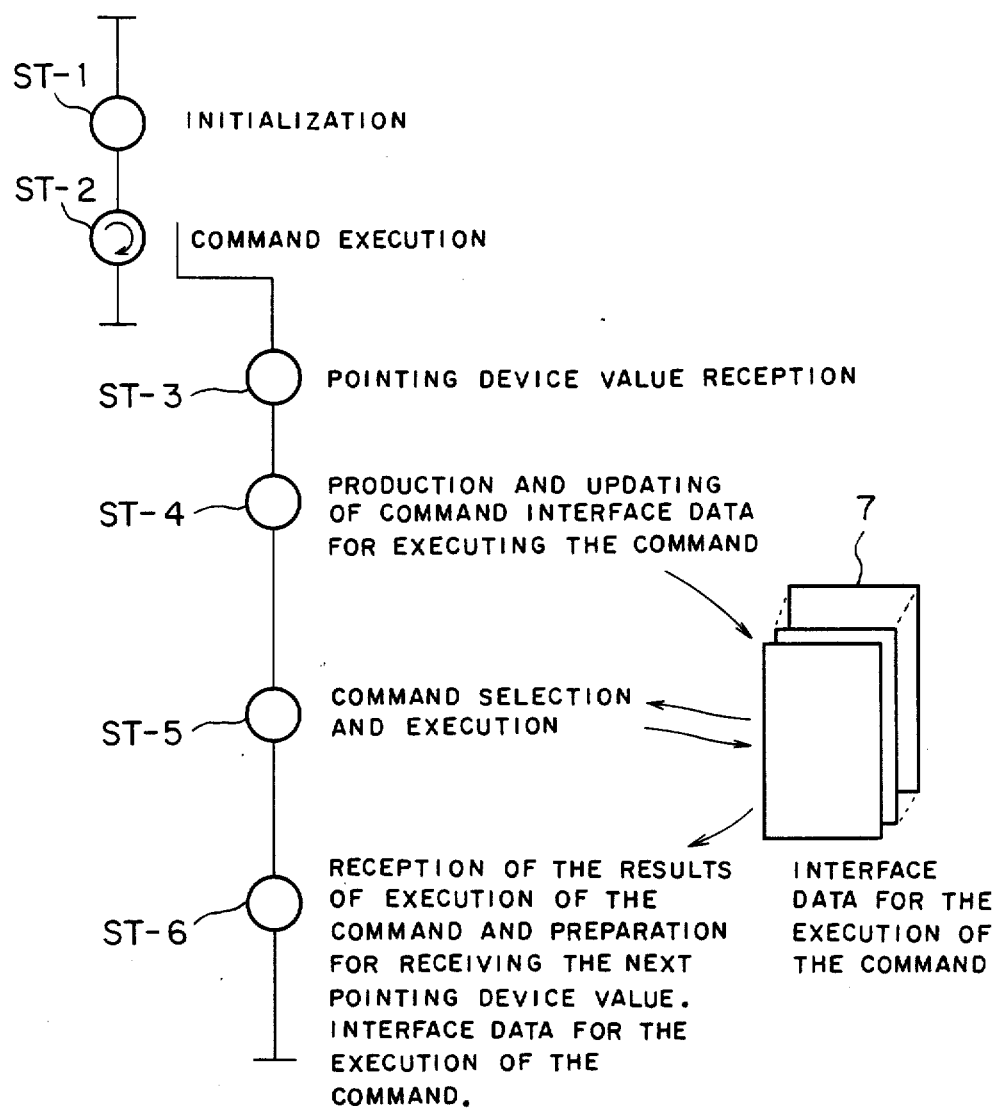
FIG. 3 is a flow chart of assistance in explaining the algorithm, namely, the principle of operation, of the man-machine interface operating system of FIG. 2.

In FIGS. 1 to 3, like reference characters designate like or corresponding parts throughout.

Referring to FIG. 2, indicated at 5 is a pointing device batch control input unit for example, a mouse at 6 is a command execution control unit, and at 7 is command interface data produced by the command execution control unit 6.

The manner of operation of the man-machine interface operating system will be described hereinafter with reference to FIG. 3 showing the algorithm, namely, the principle of operation, of the man-machine interface operating system. In the command execution routine, a pointing device value is read (ST-3), and a decision is made as to whether the pointing device value is a continuous command or a new command to update and produce an interface data for executing the command (ST-4). The input data given by the pointing device is written in the interface data. Then, a command is selected by the new command name thus obtained, and then the command is executed (ST-5). The command is executed in steps each for input data.

The command execution control unit writes the input information obtained by the preceding step (data for interruption and restart) and information for receiving the next pointing device value (the category input data, the shape of the cursor for guiding the operator for operation) to the interface data for executing the command.

At the last step, the command execution control unit receives the results of execution of the command, prepares for receiving the next pointing device value, and updates or discards the interface data for executing the command (ST-6). The command execution steps are repeated as long as the routine continues.

Although the embodiment has been described as employing a pointing device as the interactive input device, the pointing device may be used in combination with an input keyboard or the pointing device may be substituted by an input keyboard. Further, a light pen may be employed for input and the light pen may be used with a keyboard.

As apparent from the foregoing description, according to the present invention, the man-machine interface operating system for operating input data in a CAD system or the like in which the display means may be a conventional cathode ray tube (CRT), operates input data by a pointing device in batch operation to determine the interface for each processing function uniformly. Accordingly, the command can optionally be interrupted and restarted, the flexibility of the interactive operation is improved, and command input operation can efficiently be carried out.

What is claimed is:

1. A man-machine interface operating system, including display means, for interactive processing of input data given by means of input means in accordance with a menu displayed on the display means, which comprises:

input batch operation means which receives input data from the input means;

command execution control means which produces and/or updates interface data for executing a command based on the input data received by the input batch operation means, and makes a decision based on the interface data as to whether the command to be executed is a continuous command or a new command;

command processing means which processes the command selected by the command execution control means;

whereby a command execution routine is repeated according to the produced and/or updated interface data for executing the command.

2. A man-machine interface operating system as recited in claim 1, wherein the input data given by the input means is an image data, a command based on the image data is updated by input data sequentially given by the input means to execute the command for graphic processing.

3. A man-machine interface operating system as recited in claim 1, wherein said input means is a pointing device, and the command is executed based on input data given by the pointing device.

4. A man-machine interface operating system as recited in claim 3, wherein the pointing device serving as said input means is a mouse which is moved on a fixed plate to give position data to the interface.

5. A man-machine interface operating system as recited in claim 3, wherein the pointing device serving as said input means is a keyboard, and the command is executed based on the data given through operation of the keyboard.

6. A man-machine interface operating system as recited in claim 3, wherein the pointing device serving as said input means is a combination of a mouse and a keyboard.

7. A man-machine interface operating system as recited in claim 1, wherein said display means is a cathode ray tube (CRT), said input means includes a keyboard and a light pen, graphic data displayed on the CRT is rewritten with the light pen for interactive operation.

8. A man-machine interface operating system as recited in claim 1, wherein said display means is a cathode ray tube (CRT), said input means includes a keyboard, and a mouse which is supplemented with input by the keyboard, a graphic data command execution routine is carried out on the basis of the data given by the keyboard and the data given by the mouse.

9. A man-machine interface operating system as recited in claim 1, wherein said command execution control means controls said command processing means so that the command processing means executes the command after updating the interface data for executing the command when the input data given by said input batch operation meas is a continuous command, and so that the command processing means executes the command after producing new interface data for executing the command when the command is a new command.

10. A man-machine interface operating system as recited in claim 1, wherein the software of said command execution control means is constituted to execute the command in steps for each input data.

* * * * *

UNITED STATES PATENT AND TRADEMARK OFFICE
CERTIFICATE OF CORRECTION

PATENT NO. : 4,797,854

DATED : January 10, 1989

INVENTOR(S) : Katsuichi Nakazaki et al.

It is certified that error appears in the above-identified patent and that said Letters Patent is hereby corrected as shown below:

```
Column 1, line 12, after "particularly" insert a comma --,--;
          same line, after "relates" delete the comma ",".
Column 2, line 26, after "unit" insert a comma --,--;
          same line, after "mouse" insert a comma --,--;
          line 68, after "like" insert a comma --,--.
Column 4, line 32, "meas" should be --means--;
          line 37, delete "the".
```

Signed and Sealed this

Fifteenth Day of August, 1989

Attest:

DONALD J. QUIGG

Attesting Officer

Commissioner of Patents and Trademarks